United States Patent [19]

Richeson, Jr.

[11] 3,735,034

[45] May 22, 1973

[54] LEVEL MODULATOR FOR FACSIMILE TRANSMITTER

[75] Inventor: William E. Richeson, Jr., Fort Wayne, Ind.

[73] Assignee: The Magnavox Company, Fort Wayne, Ind.

[22] Filed: Jan. 12, 1972

[21] Appl. No.: 217,249

Related U.S. Application Data

[63] Continuation of Ser. No. 826,506, May 21, 1969, abandoned.

[52] U.S. Cl. ........................178/7.1, 325/46, 325/61, 325/139, 330/176, 330/183, 332/17, 333/75

[51] Int. Cl. .........H04n 1/40, H04b 1/00, H03h 7/00

[58] Field of Search ...................178/7.1, 66 R, 66 A, 178/67; 179/15 BM; 307/264; 325/30, 61, 36, 139, 163, 46; 330/16, 19, 29, 124, 176, 181, 183; 332/17; 333/14, 75

[56] References Cited

UNITED STATES PATENTS

| | | | |
|---|---|---|---|
| 3,213,368 | 10/1965 | Geluk | 325/147 |
| 2,842,625 | 7/1958 | Holmes | 330/29 |

*Primary Examiner*—Robert L. Griffin
*Assistant Examiner*—George G. Stellar
*Attorney*—Albert L. Jeffers et al.

[57] ABSTRACT

A scheme for level modulating a continuous wave frequency modulated signal is disclosed which gives enhanced signal to noise ratios and which finds particular utility in a facsimile transmission system. The level modulator utilizes a unique active filter circuit which has asymmetrical response characteristics.

3 Claims, 4 Drawing Figures

INVENTOR
WILLIAM E. RICHESON
BY Jeffers and Young
ATTORNEYS

INVENTOR
WILLIAM E. RICHESON
BY Jeffers and Young
ATTORNEYS

INVENTOR
WILLIAM E. RICHESON
BY Jeffers and Young
ATTORNEYS

LEVEL MODULATOR FOR FACSIMILE TRANSMITTER

BACKGROUND OF THE INVENTION

This application is a continuation of applicant's copending application Ser. No. 826,506 now abandoned.

This invention relates to a scheme for level modulating a continuous wave frequency modulated signal and more particularly to such a level modulator for a facsimile transmission system. The present invention finds utility in a facsimile system such as disclosed in copending application Ser. No. 669,315, filed Sept. 20, 1967 now U.S. Pat. No. 3,699,249 in the names of Glenn A. Reese and Paul J. Crane as well as copending application Ser. No. 803,612, entitled "Improved Facsimile System" filed March 3, 1969 in the names of William E. Richeson and Robert H. Dreisbach, now U.S. Pat. No. 3,622,698, dated November 23, 1971.

Facsimile systems such as illustrated in the copending applications optically scan an original document, convert the optical information into a voltage representative thereof, and convert this voltage so as to frequency modulate an audio signal. This frequency modulated audio signal is then coupled to and transmitted over standard telephone lines to a remote point. At the remote point, the audio signal is amplified, detected and converted back to a voltage for operating a transducer to reproduce a copy of the original document. The present invention allows level modulation of this frequency modulated audio signal so as to yield an improved signal to noise ratio in the operation of such a facsimile system.

In the past, good copy could only be run on fairly good voice quality telephone lines. Generally, but not always, are these lines available. The facsimile equipment operator must exercise a reasonable degree of subjective evaluation of the particular phone line in use. If the line is too poor, the operator simply replaces the call and when the line is of obviously adequate quality, facsimile transmission is begun, however, there is a marginal area where the operator merely gambles as to whether the line is of adequate quality for transmission. Because of the nature of this operation, it is not uncommon that poor copy is occasionally run.

Accordingly, it is one object of the present invention to greatly enhance the probability of getting high quality facsimile copy under most, if not all conditions.

There are several factors to be considered in the problem of telephone line quality as it relates to facsimile transmission. As pointed out in the article, "Capabilities of the Telephone Network for Data Transmission" by Alexander, Gryb and Nast published in the May 1960 Bell System Technical Journal, Vol. 39, Pages 431–476, the expected upper break points of the phone lines is in the neighborhood of 1100 cycles per second and at 2600 cycles per second, 90 percent of the telephone lines have more than a 6 db loss, 50 percent of the lines have more than 10 db loss, and 10 percent of the lines have a loss in excess of 14 db. Thus, in the case of a facsimile system which transmits a continuous wave frequency modulated signal which varies between 1500 and 2450 cycles per second where the 1500 cycle per second signal represents a white area on the original document and the 2450 cycle per second signal represents a black area, the signal level representing the black could be in the neighborhood of 12 db down at the receiver due to the frequency response characteristics of the telephone line. From time to time the continuous wave frequency modulated facsimile system will be operating near the knee of its signal to noise out vs. signal to noise in curve due to telephone line attenuation and frequency response variance. These effects cause noise or interference to adversely affect the copy especially during a transition from a gray area to a black area on that copy. It would be costly and difficult to attempt to solve this problem by pre and post equalization through the use of filters because such filters would need to have a linear phase response throughout the spectral region of interest while simultaneously having the necessary frequency response characteristics. The need for a linear phase response becomes apparent when one considers the fact that signals in a facsimile transmission system are quite commonly of a square wave form. A filter will behave like a delay line and thus the effective sinusoidal components of the square wave like data will be delayed by differing amounts in a filter resulting in something other than the desired replica as the output. This phenomenon is denominated a group delay problem.

Accordingly, another object of the present invention is to provide an economical substitute for such filter circuits which does not suffer from the group delay problem.

In FIG. 22 of the above Alexander et al. paper it is further pointed out that 10 percent of the telephone lines have less than a 9 db loss, 50 percent of the lines have less than a 15 db loss, and 90 percent of the lines have less than a 21 db loss for the entire band pass. Thus, it is clear that from time to time substantial degradation of the signal to noise ratio of the whole spectrum for the system will be encountered.

Telephone line specifications were created for and are aptly suited to speech transmission. In the case of speech, there is an approximate ratio between peak and average voltage of 5 to 1 or about 14 db of power. As noted in the paper, "Acoustical Coupling for Data Transmission," a special Bell Laboratories Paper of November 1968, the telephone line has a mean power limitation integrated over a three second interval. Thus, the telephone lines will tolerate larger voltages for short periods of time but are much more restricted as to the peak voltage which will be tolerated in a continuous wave signal. In consideration of these facts and the troubles that were experienced from time to time in sending facsimile information over commercial telephone lines, level modulation of the FM carrier was selected as a means of improving the signal to noise ratio of the system while still living within the telephone system specifications.

Accordingly, it is an object of the present invention to provide a level modulating scheme for an FM system.

It is another object of the present invention to provide a facsimile transmitter which utilizes telephone line capacities to a greater extent than was heretofore possible.

It is a further object of the present invention to provide a level modulating scheme for an FM system which yields an enhanced signal to noise ratio.

It is a still further object of the present invention to provide an active filter having asymmetrical characteristics which allows a more practical level modulating routine.

SUMMARY OF THE INVENTION

Briefly, these and other objects and advantages of the present invention are achieved in a facsimile transmitter by providing a level or amplitude modulating circuit subsequent to a frequency modulating circuit. The signal that frequency modulates the voltage controlled oscillator also controls the level or amplitude of the output of the level modulating circuit which output is applied to an output transducer for transmission over the telephone lines. The circuit incorporates an active filter having asymmetrical characteristics. When the system is operating at a low frequency indicative of white information, it is operating at a low amplitude. When the optical scanner comes across black information, the frequency of the signal and the amplitude of the resulting FM output increases at a rather rapid rate. At a later time, when the optical scanner indicates white information again, the frequency drops down and the filter causes the amplitude to decrease but at a slower rate than its original increase. The filter circuit has two potentiometers at its output for adjusting the peak and minimum levels of the system.

BRIEF DESCRIPTION OF THE DRAWING

The subject matter which I regard as my invention is particularly pointed out and distinctly claimed in the claims. The structure and operation of my invention together with further objects and advantages may be better understood from the following detailed description given in connection with the accompanying drawing in which:

DESCRIPTION OF THE PREFERRED EMBODIMENT

Figure 1A:
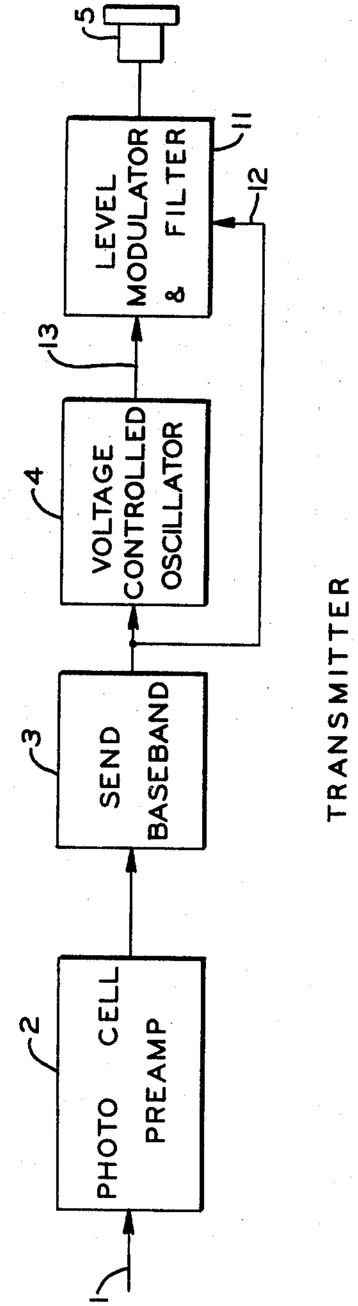
FIGS. 1*a* and 1*b* show a block diagram of a facsimile transmitter and receiver system incorporating the present invention.
Figure 1B:
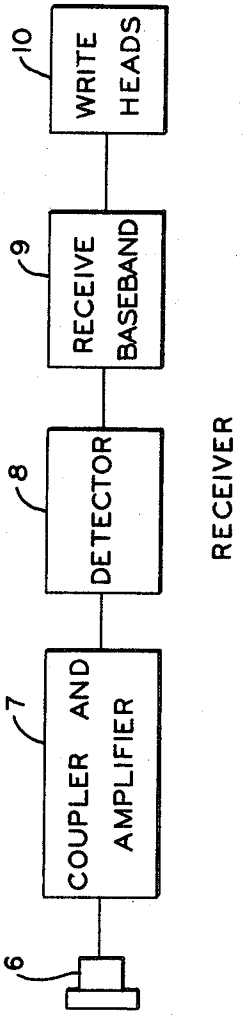

Turning now to the block diagram of a facsimile system transmitter as shown in FIG. 1a, signals indicative of the information on an original document are received at an input terminal 1. These signals might be, for example, the voltage output of a photoelectric cell. The preamplifier 2 feeds a baseband amplifier 3 which has a video output signal, that is, an unmodulated voltage representative of the original information. This video signal is fed to a voltage controlled oscillator 4 having a continuous wave frequency modulated output. This continuous wave frequency modulated signal is then fed to a level modulator and filter 11 which is also responsive to the original video signal by way of line 12 and serves to level modulate the output signal. This level modulated signal is then fed to a transducer 5 which has an audio output and may be coupled to a standard telephone line. Obviously, other types of coupling and other types of transmission media might be utilized. The facsimile receiver shown in FIG. 1*b* has a transducer 6 which receives the information from the telephone line and feeds it to an amplifier 7 and a detector 8. Thus, the output of the detector which drives the baseband amplifier is an unmodulated voltage wave form representative of the original document information. The output of the baseband amplifier 9 drives the writing heads 10 of the facsimile receiver. The level modulator and filter 11 is shown having two input terminals 12 and 13 whose structure and function is more readily seen in reference to FIG. 2.

Figure 2:
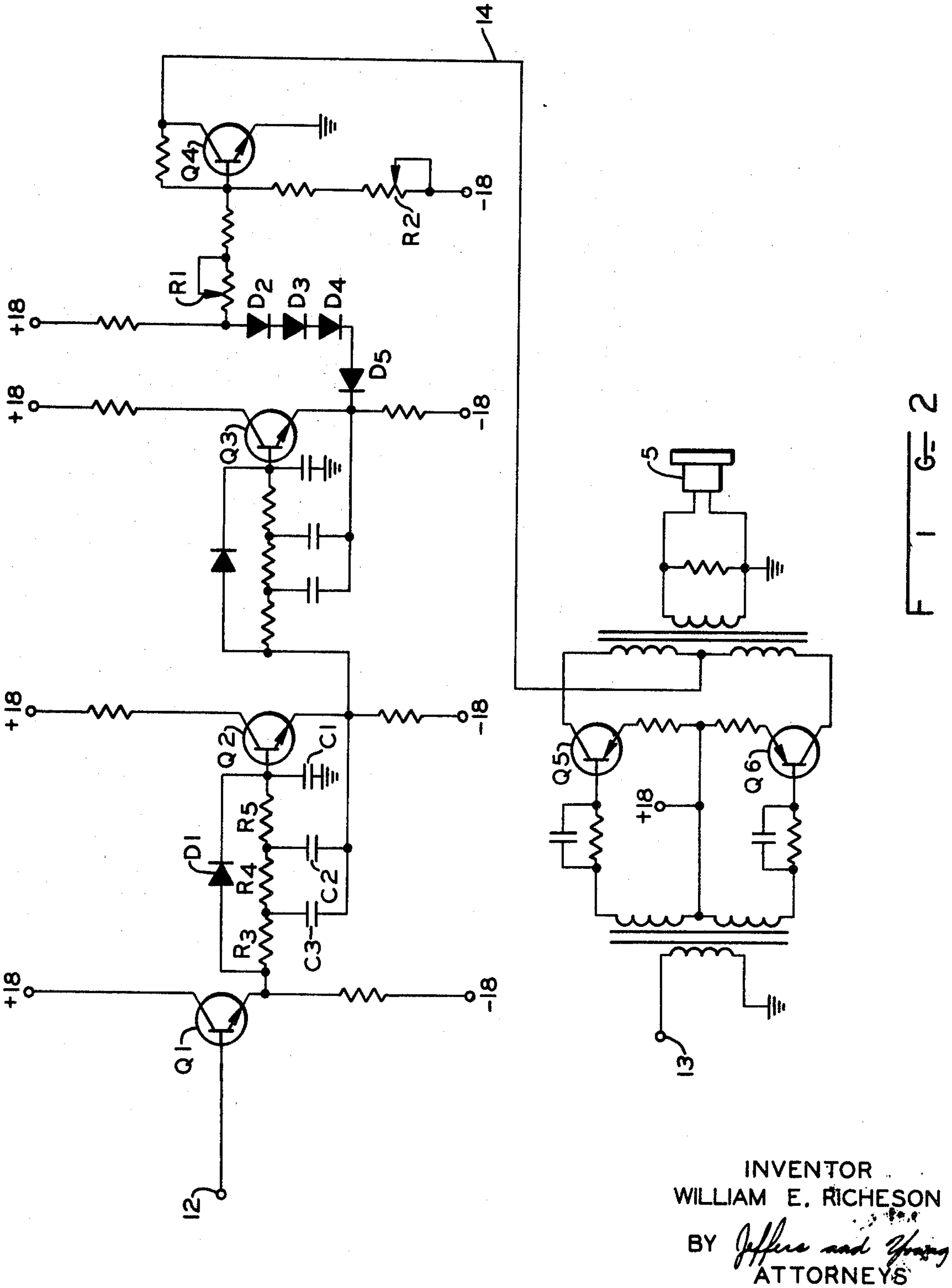
FIG. 2 is a schematic diagram of the level modulator and filter of FIG. 1.

In FIG. 2 the input terminal 12 receives the baseband signal and drives an active low pass filter consisting of the transistors Q1, Q2, and Q3. The filter has asymmetrical characteristics, that is it responds differently to positive going signals than to negative going signals. Thus for example, the roll off frequency for positive going signals may be in excess of 2000 cps. whereas, the roll off frequency for negative going signals may be in the order of 100 cps. For a given document image, the filter allows the leading edge of the resultant level modulation signal to raise in the positive direction relatively rapidly whereas, the negative going trailing edge will decay slowly. The frequency of occurrence of the level modulation signal is thus limited by this slow decay hence the spectrum of the level modulation signals is limited or controlled by the negative going roll off response characteristics of the filter. This then, in effect, controls the level modulation spectrum so as not to interfere with or overlap the FM data spectrum. The filter was designed to have asymmetrical characteristics so that when the photocell is scanning white and then passes to black on an original document, the filter responds rapidly to increase the level of the output signal but when the photocell passes from a black area to a white area the filter responds more slowly to diminish the level of the output signal. The transistor Q4 is included in the circuit to allow the operator to set the peak or maximum level of modulation by the resistor R1 and to set the minimum level of modulation by the resistor R2.

The reason for the asymmetrical characteristics of the filter 2 should be clear from the schematic diagram. Transistors Q1, Q2, and Q3 are employed as emitter followers and thus do not introduce any phase change in themselves. A positive going signal on terminal 12 passes through the transistor Q1, the diode D1 and charges the capacitor C1. Thus, for a positive going signal, the coupling between Q1 and Q2 Is direct. For a negative going signal, however, diode D1 is blocking and transistors Q1 and Q2 are coupled by a resistive capacitive filter network consisting of three resistors R3, R4, and R5 in series and three capacitive elements C1, C2, and C3. Thus, it is seen that the response time for a positive going signal is mainly controlled by a single capacitor C1 along with the output impedance of the emitter follower Q1 and the forward impedance of the diode D1; while the response time for a negative going signal is controlled by the resistive capacitive filter network. Similar comments of course apply to the coupling between Q2 and Q3. Diodes D2, D3, D4, and D5 are used for DC level shifting purposes and are not part of the immediate Invention. In operation however, they are always in a conducting state.

Figure 3:
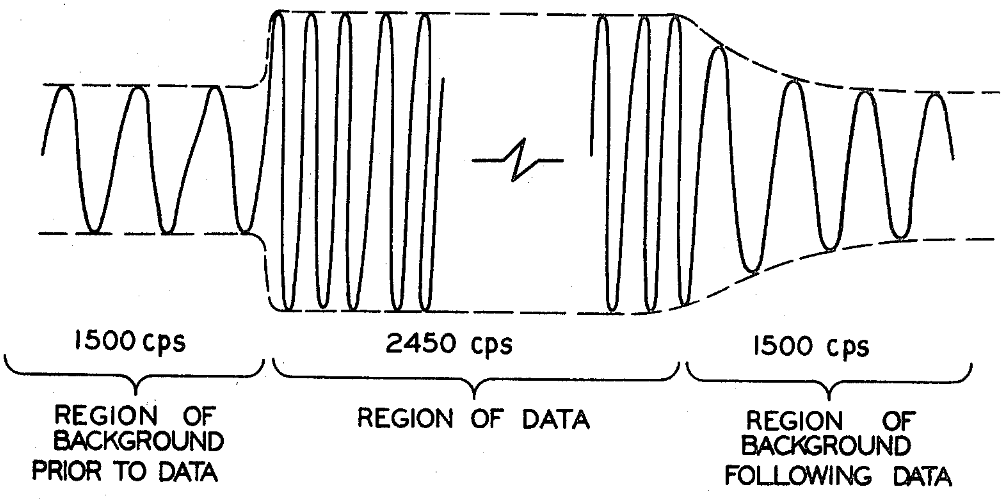
FIG. 3 shows a typical wave form of the output of the modulator.

Transistors Q5 and Q6 form the nucleus of the modulator itself. The modulator is seen to be a push-pull amplifier of the continuous wave frequency modulated signals received at its input 13 whose amplitude is controlled by the signals received on the output lead 14 from the filter. A typical output wave form from this modulator is illustrated in FIG. 3. If we suppose that typed copy is being scanned by the photocell, a white region of this copy would yield the 1500 cycle per second signal on the left portion oF this wave form. When data, that is a typed letter, is encountered a positive going signal appears at terminal 12 of FIGS. 1 and 2 which by way of the filter causes the amplitude of the signal to rise rapidly as well as causing an increase in the frequency output of the voltage controlled oscillator 4. Thus, while scanning the data, the wave form is as shown in the center portion of FIG. 3, a 2450 cycle per second signal of increased amplitude. When the photocell again detects white background information of a sufficiently long duration the signal at terminal 12 is a negative golng signal which causes a slow decay in the output level as well as an Immediate decrease in the frequency output of the voltage controlled oscillator. This is illustrated in the right hand portion of FIG. 3. In a specific embodiment of the present invention, this decay time of FIG. 3 corresponded to approximately 0.455 inches on a scanned page of typed material.

It should now be clear that the present invention allows the amplitude of a carrier signal to be substantially increased when meaningful data is being transmitted and thus allows a substantially improved signal to noise ratio so that the final copy is of improved quality. The fast onset of level modulation causes the system to respond as soon as data is scanned. The slow recovery preventS spectral interference from beIng generated for short contiguous durations of white between black on the copy. For a tYped page, the ratio of background or white to data or actual typed letters may range as high as 5 to 1. Remembering that telephone lines have an average power limitation, it should be clear that a very small decrease in the voltage level associated with a white background allows one to substantially increase the voltage level associated with black or typed information. Straight forward calculations allow one to determine the specific maximum amplitude allowable in a given situation.

Thus, while the invention has been described in reference to a specific embodiment modifications will readily suggest themselves to those skilled in the art and the present invention is to be delineated only by the scope of the appended claims.

I claim:

1. An asymmetrical system for effecting the level modulation of a frequency modulated facsimile carrier signal comprising a plurality of concatenated actiVe stages, each of said active stages coupled to its successor by a passive network, said network comprising; a parallel combination of a plurality of series connected resistors and a diode, each said resistor being a bidirectional device having the ratio of the voltage thereacross to the current therethrough substantially constant, and at least one capacitor connecting each junction between two consecutive resistors to a point of reference potential.

2. In a frequency modulated continuous wave facsimile transmitter, the improvement of a level modulator comprising:

a. a low pass filter having an input for receiving an analog signal the magnitude of WhIch is indicative of facsimile information and having an output for providing level modulation signals, said filter comprising a plurality of concatenated stages each coupled to its successor by a passive asymmetrical filter network comprising a series combination of at least tWo resistors having at 'east one junction poInt therebetween, a diode connected in parallel with said series combination, and a capacitor connecting said junction point to a point of reference potential, said network thereby being adapted to give said filter asymmetrical response time properties primarily caused by the presence of said diode whereby said filter is adapted to respond differently for positive going signals than for negative going signals;

b. a modulator having at least one input for receiving frequency modulated signals and signals for level modulating those frequency modulated signals, and having an output;

c. first means coupling the output of said filter to a modulator input to provide level modulation signals to said modulator and for adjustably setting the maximum level of modulation;

d. a voltage controlled oscillator having an input and an output, said oscillator input adapted to receive substantially the same signals as received by said filter, said oscillator output being coupled to a modulator input to provide frequency modulated signals thereto; and e. second means coupled to the output of said filter and to a modulator input for adjustably setting the minimum level of modulation.

3. In a facsimile transmitter having a voltage controlled oscillator with a frequency controlling voltage input for providing frequency modulated facsimile signals as an output to a transmitter output amplifier, the improved method of level modulating in an analog manner the continuous wave frequency modulated signal to be transmitted and of effecting the transitions between levels comprising the steps of:

increasing over a first time period the amplitude of said amplifier output in response to a voltage change which increases the frequency of the voltage controlled oscillator output from a first value to a second value, said first value corresponding to white background information on the facsimile document to be transmitted, the magnitude of said amplitude increase being proportional to the magnitude of said voltage change; and decreasing, over a second time period greater than said first time period, the amplitude of said amplifier output in response to a voltage change which decreases the frequency of the voltage controlled oscillator output from said second value back to said first value, said second value corresponding to dark information on the facsimile document to be transmitted.

* * * * *